United States Patent
Sohn

(10) Patent No.: US 12,314,281 B2
(45) Date of Patent: May 27, 2025

(54) SYSTEM FOR VERIFYING HIGH-PERFORMANCE TABLE DATA CONSISTENCY BETWEEN REMOTE DBMS TABLES

(71) Applicant: XLOG Co., Ltd., Seoul (KR)

(72) Inventor: Chul Kyu Sohn, Seoul (KR)

(73) Assignee: XLOG CO., LTD., Seoul (KR)

( * ) Notice: Subject to any disclaimer, the term of this patent is extended or adjusted under 35 U.S.C. 154(b) by 0 days.

(21) Appl. No.: 18/264,728

(22) PCT Filed: Feb. 18, 2022

(86) PCT No.: PCT/KR2022/002457
§ 371 (c)(1),
(2) Date: Aug. 8, 2023

(87) PCT Pub. No.: WO2022/177368
PCT Pub. Date: Aug. 25, 2022

(65) Prior Publication Data
US 2024/0111781 A1    Apr. 4, 2024

(30) Foreign Application Priority Data
Feb. 18, 2021    (KR) .................. 10-2021-0021684

(51) Int. Cl.
*G06F 16/27* (2019.01)
*G06F 16/215* (2019.01)
(Continued)

(52) U.S. Cl.
CPC ............ *G06F 16/27* (2019.01); *G06F 16/215* (2019.01); *G06F 16/2255* (2019.01); *G06F 16/2365* (2019.01)

(58) Field of Classification Search
CPC .. G06F 16/27; G06F 16/215; G06F 16/22585; G06F 16/2365
(Continued)

(56) References Cited

U.S. PATENT DOCUMENTS 9,460,174 B2    10/2016    Sellers-Blais
9,852,207 B2    12/2017    Sellers-Blais
(Continued)

FOREIGN PATENT DOCUMENTS

JP    2018-14126 A    1/2018
KR    10-2009-0001955 A    1/2009
(Continued)

OTHER PUBLICATIONS

International Search Report of PCT/KR2022/002457, May 26, 2022, 5 pages.

*Primary Examiner* — Robert W Beausoliel, Jr.
*Assistant Examiner* — Lauren Zannah Ganger
(74) *Attorney, Agent, or Firm* — Womble Bond Dickinson (US) LLP

(57) ABSTRACT

The purpose of the present invention is to provide a system for verifying high-performance table data consistency between remote DBMS tables, which can minimize operational service downtime by verifying data consistency within a short period of time in a table unit during migration, perform consistency verification even for data from DBMSs having different character sets, without separate processing in an operating DB, and automate a process of manually verifying the consistency of hundreds to thousands of tables. In order to achieve the above purpose, the system for verifying high-performance table data consistency between remote DBMS tables according to a first embodiment of the present invention is characterized by comprising: a source DBMS; a target DBMS of the same type as the source
(Continued)

DBMS; and a first consistency verification tool for verifying data consistency by comparing data of the source DBMS and the target DBMS in a table unit.

3 Claims, 4 Drawing Sheets

(51) Int. Cl.
  *G06F 16/22* (2019.01)
  *G06F 16/23* (2019.01)
(58) Field of Classification Search
  USPC .......................................................... 707/634
  See application file for complete search history.

(56) References Cited

U.S. PATENT DOCUMENTS

| | | |
|---|---|---|
| 9,928,281 B2 | 3/2018 | Bourbonnais et al. |
| 11,573,943 B2 | 2/2023 | Kumar et al. |
| 11,625,503 B2 * | 4/2023 | Burgupalli .......... G06F 21/6218 |
| | | 707/687 |
| 2012/0030172 A1 * | 2/2012 | Pareek .................. G06F 16/275 |
| | | 707/635 |
| 2015/0339362 A1 | 11/2015 | Sellers-Blais |
| 2016/0275150 A1 | 9/2016 | Bourbonnais et al. |
| 2016/0364386 A1 | 12/2016 | Sellers-Blais |
| 2019/0370368 A1 | 12/2019 | Kim et al. |
| 2020/0401569 A1 | 12/2020 | Kumar et al. |

FOREIGN PATENT DOCUMENTS

| | | |
|---|---|---|
| KR | 10-1917807 B1 | 11/2018 |
| KR | 10-2020-0116679 A | 10/2020 |
| KR | 10-2020-0137520 A | 12/2020 |
| KR | 10-2021-0016662 A | 2/2021 |
| WO | WO 2020/254889 A1 | 12/2020 |

* cited by examiner

SYSTEM FOR VERIFYING HIGH-PERFORMANCE TABLE DATA CONSISTENCY BETWEEN REMOTE DBMS TABLES

CROSS-REFERENCE TO RELATED APPLICATION

This application is a U.S. National Phase Patent Application of International Application Number PCT/KR2022/002457, filed on Feb. 18, 2022, which claims priority of Korean Patent Application Number 10-2021-0021684, filed on Feb. 18, 2021, the entire content of each of which is incorporated herein by reference.

TECHNICAL FIELD

The present invention relates to a system for verifying high-performance table data consistency between remote DBMS tables, and more particularly, to a system for verifying high-performance table data consistency between remote DBMS tables, which rapidly compare data of tables which are present in a homogeneous or heterogeneous DBMS system to verify consistency of the table.

BACKGROUND ART

With entering the information age, large amounts of data are generated in various fields such as e-commerce, Internet finance, and Internet shopping malls, and by the resulting use of various databases and a replication or migration task of data between databases, the same data is commercially used in several databases.

In this process, data may be missing or damaged during the data replication and migration task, so an efficient operation method is required to ensure data reliability.

In order to ensure reliability of data consistency when replicating or migrating data between a source database and a target database, generally, all or part of the data of the source database and the target database is imported and the entire data is compared in units of rows to check and maintain the data consistency.

However, this method of verifying data consistency in ROW units has a problem in that the verification time increases as the number of data increases.

Therefore, there is a problem in that the data consistency verification method in ROW units cannot be used during migration work that must complete consistency verification within a specified time.

DISCLOSURE

Technical Problem

The purpose of the present invention is to provide a system for verifying high-performance table data consistency between remote DBMS tables, which can minimize operational service downtime by verifying data consistency within a short period of time in a table unit during migration, perform consistency verification even for data from DBMSs having different character sets, without separate processing in an operating DB, and automate a process of manually verifying the consistency of hundreds to thousands of tables.

Technical Solution

In order to achieve the purpose, a system for verifying high-performance table data consistency between remote DBMS tables according to a first embodiment of the present invention includes: a source DBMS; a homogeneous target DBMS to the source DBMS; and a first consistency verification tool comparing data of the source DBMS and data of the target DBMS in units of a table to verify data consistency.

In addition, in the system for verifying high-performance table data consistency between remote DBMS tables according to the first embodiment of the present invention, the first consistency verification tool includes a first request unit requesting a query using a hash function to each of the source DBMS and the target DBMS, and a first storage unit being returned with and storing hash values extracted by performing the query from the source DBMS and the target DBMS, respectively.

In addition, in the system for verifying high-performance table data consistency between remote DBMS tables according to the first embodiment of the present invention, the first consistency verification tool includes a first comparison verification unit verifying the data consistency by comparing the hash values in unit of the table, and a first output unit outputting verification data of which verification is completed.

In addition, in the system for verifying high-performance table data consistency between remote DBMS tables according to the first embodiment of the present invention, the comparison is performed in parallel.

In order to achieve the purpose, a system for verifying high-performance table data consistency between remote DBMS tables according to a second embodiment of the present invention includes: a source DBMS; a heterogeneous target DBMS to the source DBMS; and a second consistency verification tool comparing data of the source DBMS and the target DBMS in unit of a table, and verifying data consistency.

In addition, in the system for verifying high-performance table data consistency between remote DBMS tables according to the second embodiment of the present invention, the second consistency verification tool includes a second request unit requesting extraction of table data to a table of each of the source DBMS and the target DBMS, a second storage unit being returned with and storing the table data extracted from the table of each of the source DBMS and the target DBMS, and a second computation unit computing a hash value from each table data.

In addition, in the system for verifying high-performance table data consistency between remote DBMS tables according to the second embodiment of the present invention, the second consistency verification tool includes a first extraction unit extracting the computed hash value, a second comparison verification unit comparing and verifying the hash values, and a second output unit outputting verification data of which verification is completed.

In order to achieve the purpose, a system for verifying high-performance table data consistency between remote DBMS tables according to a third embodiment of the present invention includes: a source DBMS; a target DBMS having a different character set from the source DBMS; and a third consistency verification tool comparing data of the source DBMS and the target DBMS in unit of a table, and verifying data consistency.

In addition, in the system for verifying high-performance table data consistency between remote DBMS tables according to the third embodiment of the present invention, the third consistency verification tool includes a third request unit requesting extraction of table data to a table of each of the source DBMS and the target DBMS, a third storage unit being returned with and storing data extracted with a Hexcode of the table data from the table of each of the source DBMS and the target DBMS, and an encoding unit encoding the stored data with character sets suitable for the source DBMS and the target DBMS.

In addition, in the system for verifying high-performance table data consistency between remote DBMS tables according to the third embodiment of the present invention, the third consistency verification tool includes a second extraction unit extracting a hash value from the encoded data, a third comparison verification unit comparing and verifying the hash values, and a third output unit outputting verification data of which verification is completed.

Specific details of other exemplary embodiments are included in "Details for carrying out the invention" and accompanying "drawings".

Advantages and/or features of the present invention, and a method for achieving the advantages and/or features will become obvious with reference to various exemplary embodiments to be described below in detail together with the accompanying drawings.

However, the present invention is not limited only to a configuration of each exemplary embodiment disclosed below, but may also be implemented in various different forms. The respective exemplary embodiments disclosed in this specification are provided only to complete disclosure of the present invention and to fully provide those skilled in the art to which the present invention pertains with the category of the invention, and the present invention will be defined only by the scope of each claim of the claims.

Advantageous Effects

According to the present invention, there is an effect in that it is possible to minimize operational service downtime by verifying data consistency within a short period of time in a table unit during migration, perform consistency verification even for data from DBMSs having different character sets, without separate processing in an operating DB, and automate a process of manually verifying the consistency of hundreds to thousands of tables.

BEST MODE

Figure 1:
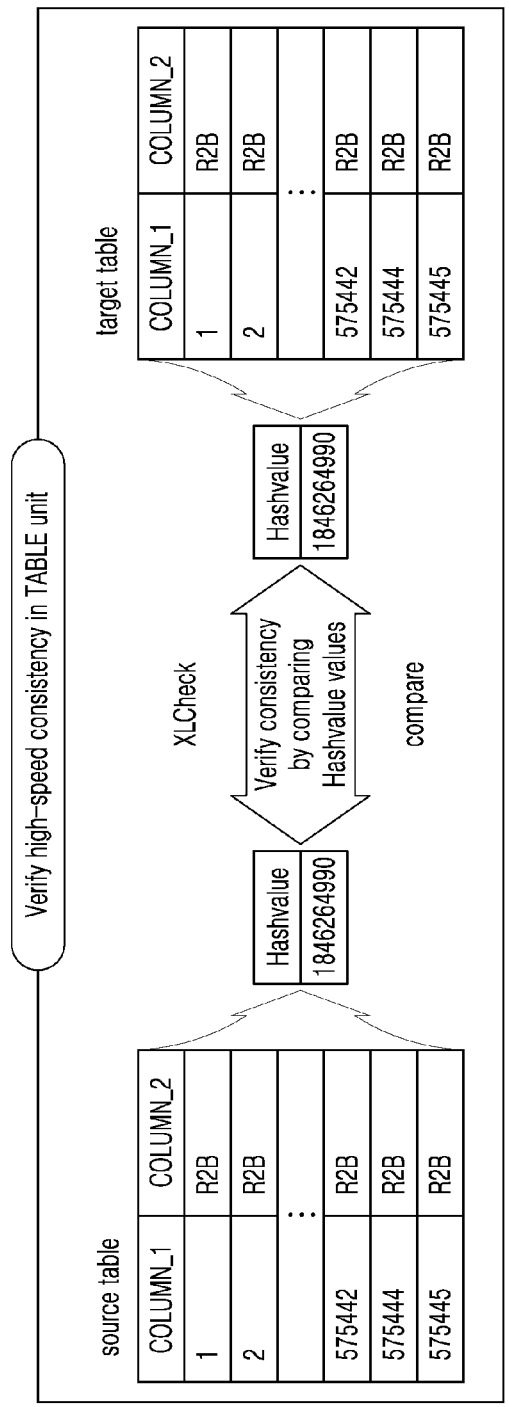
FIG. 1 is a conceptual diagram illustrating a concept of a system for verifying high-performance table data consistency between remote DBMS tables according to the present invention.

A system for verifying high-performance table data consistency between remote DBMS tables according to a first embodiment of the present invention includes: a source DBMS; a homogeneous target DBMS to the source DBMS; and a first consistency verification tool comparing data of the sourced DBMS and data of the target DBMS in units of a table to verify data consistency.

MODE FOR INVENTION

Before describing the present invention in detail, the terms or words used in this specification should not be construed as being unconditionally limited to their ordinary or dictionary meanings, and in order for the inventor of the present invention to describe his/her invention in the best way, concepts of various terms may be appropriately defined and used, and furthermore, the terms or words should be construed as means and concepts which are consistent with a technical idea of the present invention.

That is, the terms used in this specification are only used to describe preferred embodiments of the present invention, and are not used for the purpose of specifically limiting the contents of the present invention, and it should be noted that the terms are defined by considering various possibilities of the present invention.

Further, in this specification, it should be understood that, unless the context clearly indicates otherwise, the expression in the singular may include a plurality of expressions, and similarly, even if it is expressed in plural, it should be understood that the meaning of the singular may be included.

In the case where it is stated throughout this specification that a component "includes" another component, it does not exclude any other component, but further includes any other component unless otherwise indicated.

Furthermore, it should be noted that when it is described that a component "exists in or is connected to" another component, this component may be directly connected or installed in contact with another component, and in inspect to a case where both components are installed spaced apart from each other by a predetermined distance, a third component or means for fixing or connecting the corresponding component to the other component may exist, and the description of the third component or means may be omitted.

On the contrary, when it is described that a component is "directly connected to" or "directly accesses" to another component, it should be understood that the third element or means does not exist.

Similarly, it should be construed that other expressions describing the relationship of the components, that is, expressions such as "between" and "directly between" or "adjacent to" and "directly adjacent to" also have the same purpose.

In addition, it should be noted that if terms such as "one side", "other side", "one side", "other side", "first", "second", etc., are used in this specification, the terms are used to clearly distinguish one component from the other component and a meaning of the corresponding component is not limited used by the terms.

Further, in this specification, if terms related to locations such as "upper", "lower", "left", "right", etc., are used, it should be understood that the terms indicate a relative location in the drawing with respect to the corresponding component and unless an absolute location is specified for their locations, these location-related terms should not be construed as referring to the absolute location.

Further, in this specification, in specifying the reference numerals for each component of each drawing, the same component has the same reference number even if the component is indicated in different drawings, that is, the same reference number indicates the same component throughout the specification.

In the drawings attached to this specification, a size, a location, a coupling relationship, etc. of each component constituting the present invention may be described while being partially exaggerated, reduced, or omitted for sufficiently clearly delivering the spirit of the present invention, and thus the proportion or scale may not be exact.

Further, hereinafter, in describing the present invention, a detailed description of a configuration determined that may unnecessarily obscure the subject matter of the present invention, for example, a detailed description of a known technology including the prior art may be omitted.

Hereinafter, exemplary embodiments of the present invention will be described in detail with reference to related drawings.

FIG. 1 is a conceptual diagram illustrating a concept of a system for verifying high-performance table data consistency between remote DBMS tables according to the present invention.

Referring to FIG. 1, in the system for verifying high-performance table data consistency between remote DBMS tables according to the present invention, the consistency verification tool has a function of verifying the consistency of a table by rapidly comparing the same DBMS, different DBMSs, and data of tables which are present in DBMSs having different character sets.

By a method of rapidly verifying the consistency of table-level data, the consistency is verified by comparing hash values in a table of a source DBMS and a table of a target DBMS.

This will be described in more detail with reference to FIGS. 2 to 7.

Figure 2:
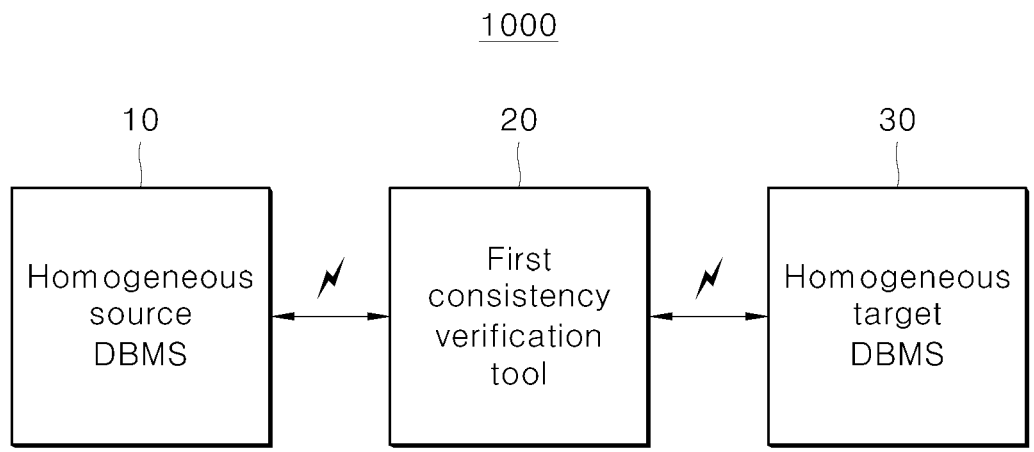
FIG. 2 is a block diagram illustrating an overall configuration of a system for verifying high-performance table data consistency between remote DBMS tables according to a first embodiment of the present invention.

FIG. 2 is a block diagram illustrating an overall configuration of a system for verifying high-performance table data consistency between remote DBMS tables according to a first embodiment of the present invention.

Referring to FIG. 2, the system 1000 for verifying high-performance table data consistency between remote DBMS tables according to the first embodiment of the present invention includes a homogeneous source DBMS 10, a first consistency verification tool 20, and a homogeneous target DBMS 30. The system 1000 may be implemented by one or more computers, each including a processor and memory.

The homogeneous source DBMS 10 is a DBMS including an original database in order to perform replication of data to the homogeneous target DBMS 30.

The homogeneous target DBMS 30 is a DBMS of a target to which the original database of the homogeneous source DBMS 10 is replicated.

The first consistency verification tool 20 verifies data consistency by comparing data of the homogeneous source DBMS 10 and the homogeneous target DBMS 30 in units of the table.

For example, if the homogeneous source DBMS 10 is Oracle and the homogeneous target DBMS 30 is Oracle, Oracle to Oracle data consistency verification is performed.

Figure 3:
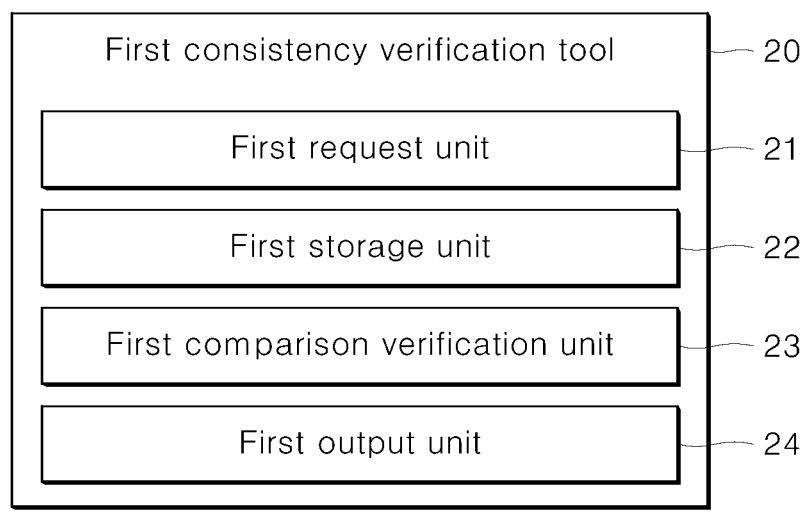
FIG. 3 is a block diagram illustrating a configuration of a first consistency verification tool in the system for verifying high-performance table data consistency between remote DBMS tables according to the first embodiment of the present invention.

FIG. 3 is a block diagram illustrating a configuration of a first consistency verification tool in the system for verifying high-performance table data consistency between remote DBMS tables according to the first embodiment of the present invention.

Referring to FIG. 3, in the system 1000 for verifying high-performance table data consistency between remote DBMS tables according to the first embodiment of the present invention, the first consistency verification tool 20 includes a first request unit 21, a first storage unit 22, a first comparison verification unit 23, and a first output unit 24.

The first request unit 21 requests a query using a hash function to each of the homogeneous source DBMS 10 and the homogeneous target DBMS 30.

For example, the first request unit 21 may also request each DBMS to perform a query using ORA_HASH in a Java Database Connectivity (JDBC) scheme.

Here, the query is a computer language used to request information collection.

In addition, the JDBC is a Java API that allows Java to access a database.

These JDBC provides a method of querying or updating data in the database.

The first storage unit 22 returns and stores a hash value extracted by performing the query each from the homogeneous source DBMS 10 and the homogeneous target DBMS 30.

The first comparison verification unit 23 performs verification by comparing the hash values stored in the first storage unit 22 in unit of the table.

The first output unit 24 outputs verification data of which verification is completed by the first comparison verification unit 23.

An operator verifies the verification data outputted by the first output unit 23 to confirm a data consistency verification result.

Further, in the system 1000 for verifying high-performance table data consistency between remote DBMS tables according to the first embodiment of the present invention, when the verification is performed by comparing the hash values in unit of the table by the first comparison verification unit 23, the comparison may be performed in parallel.

In other words, data consistency verification between homogeneous DBMSs is performed as follows.

For example, Oracle-to-Oracle data consistency verification quickly extracts a hash value for table data by using the ORA_HASH function provided by Oracle check whether the data consistency is matched.

Further, in Oracle, parallel performing is enabled by extracting the hash value to enable quicker data processing.

Figure 4:
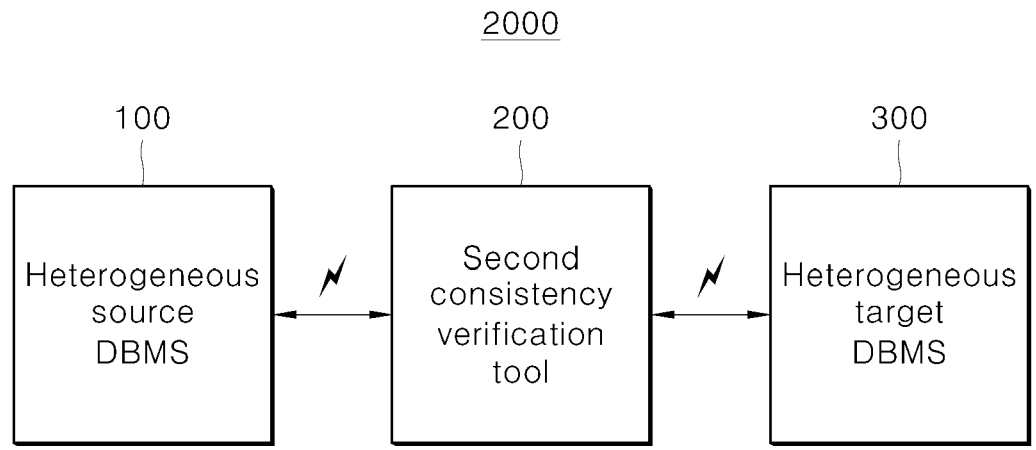
FIG. 4 is a block diagram illustrating an overall configuration of a system for verifying high-performance table data consistency between remote DBMS tables according to a second embodiment of the present invention.

FIG. 4 is a block diagram illustrating an overall configuration of a system for verifying high-performance table data consistency between remote DBMS tables according to a second embodiment of the present invention.

Referring to FIG. 4, the system 2000 for verifying high-performance table data consistency between remote DBMS tables according to the second embodiment of the present invention includes a heterogeneous source DBMS 100, a second consistency verification tool 200, and a heterogeneous target DBMS 300. The system 2000 may be implemented by one or more computers, each including a processor and memory.

The heterogeneous source DBMS 100 is a DBMS including an original database in order to perform replication of data to the heterogeneous target DBMS 300.

The heterogeneous target DBMS 300 is a DBMS of a target to which the original database of the heterogeneous source DBMS 100 is replicated.

The second consistency verification tool 200 verifies data consistency by comparing data of the heterogeneous source DBMS 100 and the heterogeneous target DBMS 300 in units of the table.

For example, if the heterogeneous source DBMS 100 is Oracle and the heterogeneous target DBMS 300 is MySQL, Oracle to MySQL data consistency verification is performed.

In other words, to verify data consistency between heterogeneous DBMSs, data is extracted through the JDBC, and Java hash values for table data are extracted using the hash function provided by JAVA to verify the data consistency.

Figure 5:
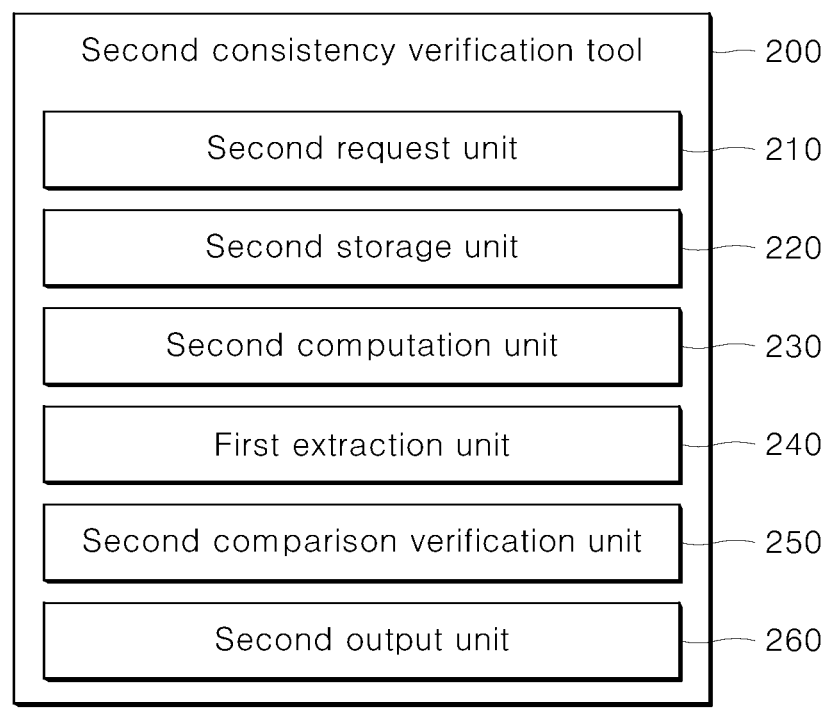
FIG. 5 is a block diagram illustrating a configuration of a second consistency verification tool in the system for verifying high-performance table data consistency between remote DBMS tables according to the second embodiment of the present invention.

FIG. 5 is a block diagram illustrating a configuration of a second consistency verification tool in the system for verifying high-performance table data consistency between remote DBMS tables according to the second embodiment of the present invention.

Referring to FIG. 5, in the system 2000 for verifying high-performance table data consistency between remote DBMS tables according to the second embodiment of the present invention, the second consistency verification tool 200 includes a second request unit 210, a second storage unit 220, a second computation unit 230, a first extraction unit 240, a second comparison verification unit 250, and a second output unit 260.

The second request unit 210 requests extraction of the table data to each of the heterogeneous source DBMS 100 and the heterogeneous target DBMS 300.

The second storage unit 220 is returned with and stores the table data extracted from each of the heterogeneous source DBMS 100 and the heterogeneous target DBMS 300.

The second computation unit 230 computes hash values from respective table data stored in the second storage unit 220.

The first extraction unit 240 extracts the hash value computed by the second computation unit 230.

The second comparison verification unit 250 compares and verifies the hash values extracted by the first extraction unit 240.

The second output unit 260 outputs verification data of which verification is completed by the second comparison verification unit 250.

The operator confirms the verification data outputted by the second output unit 260 to confirm a data consistency verification result.

In other words, data consistency verification between heterogeneous DBMSs is performed as follows.

For example, to verify data accuracy between heterogeneous DBMSs, such as verifying Oracle vs. MySQL data consistency, data is extracted through the JDBC, and Java hash values for table data are extracted using the hash function provided by Java to verify data consistency.

Data consistency verification between the heterogeneous DBMSs includes Oracle, MSSQL, MySQL, MariaDB, PostgreSQL, Informix, DB2, Tibero, Cubrid, Goldilocks, Altibase, GreenPlum, Veritica, PDA (Netizza), TeraDB, EnterpriseDB (EDB) Postgres Plus Advanced Server, etc., may also be used.

Figure 6:
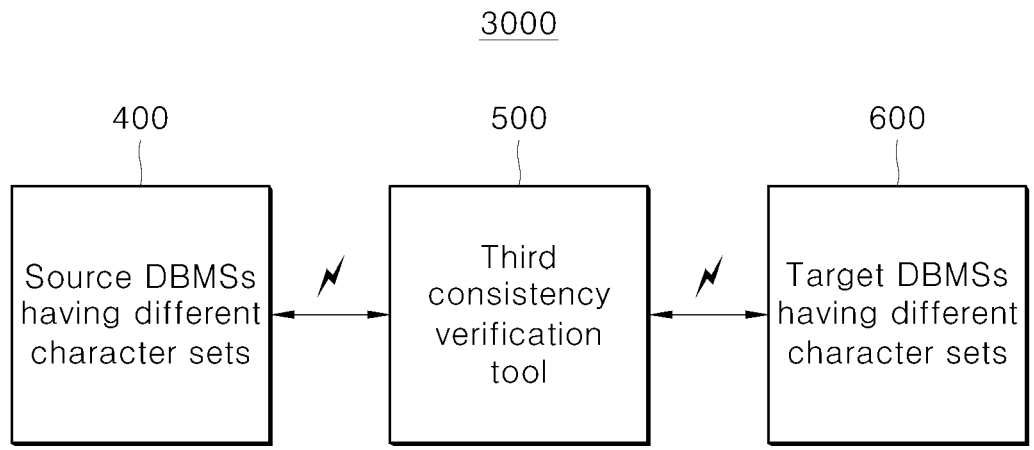
FIG. 6 is a block diagram illustrating an overall configuration of a system for verifying high-performance table data consistency between remote DBMS tables according to a third embodiment of the present invention.

FIG. 6 is a block diagram illustrating an overall configuration of a system for verifying high-performance table data consistency between remote DBMS tables according to a third embodiment of the present invention.

Referring to FIG. 6, the system 3000 for verifying high-performance table data consistency between remote DBMS tables according to the third embodiment of the present invention includes source DBMSs 400 having different character sets, a third consistency verification tool 500, and target DBMSs 600 having different character sets. The system 3000 may be implemented by one or more computers, each including a processor and memory.

The source DBMSs 400 having different character sets is a DBMS including the original database in order to perform replication of data to the target DBMSs 600 having different character sets.

The target DBMSs 300 having different character sets is a DBMS of a target to which the original database of the source DBMSs 400 having different character sets is replicated.

The third consistency verification tool 500 verifies data consistency by comparing data of the source DBMSs 400 having different character sets and the target DBMSs 600 having different character sets in units of the table.

For example, if the source DBMSs 400 having different character sets are Oracle and the target DBMSs 400 having different character sets are Oracle, Oracle to Oracle data consistency verification is performed.

Here, the character set is a character encoding created by Digital Equipment Corporation (DEC) in 1983 for use in a popular VT220 terminal.

This is an 8-bit extension of ASCII that adds accent characters, currency symbols, and other glyphs not found in 7-bit ASCII.

This is only one of the code pages implemented for the VT220 National Replacement Character Set (NRCS).

MCS is registered as IBM Code Page 1100 (International Emulation) since 1992.

According to the related alignment, Oracle is called WE8DEC, N8DEC, DK8DEC, S8DEC, and SF8DEC.

In this way, in order to verify data consistency between DBMSs having different character sets, data is extracted by a Hexcode by using an internal function provided by the DBMS when extracting data, and encoded into the character sets suitable for each DBMS to verify the data consistency with the extracted hash value.

Figure 7:
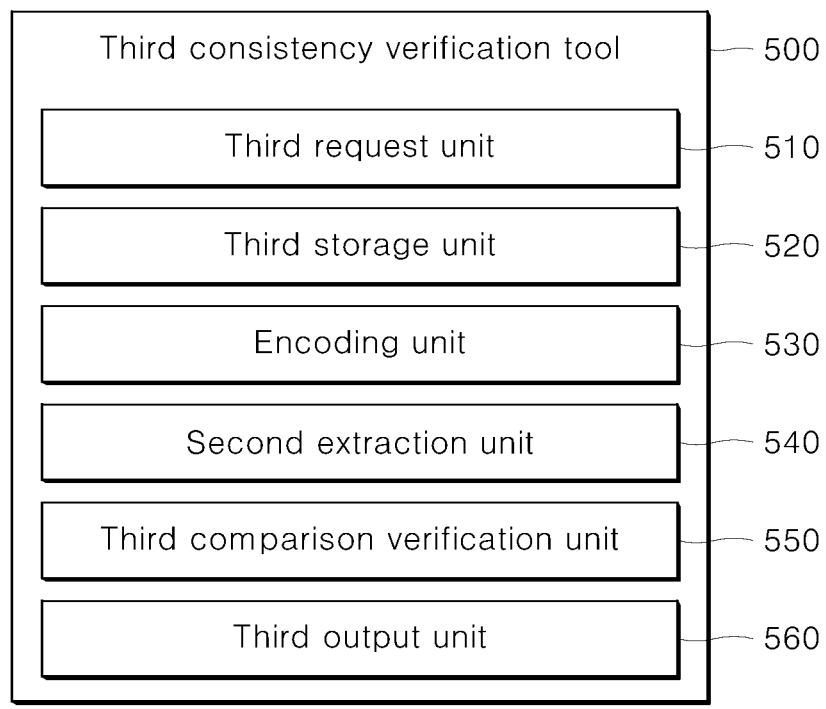
FIG. 7 is a block diagram illustrating a configuration of a third consistency verification tool in the system for verifying high-performance table data consistency between remote DBMS tables according to the third embodiment of the present invention.

FIG. 7 is a block diagram illustrating a configuration of a third consistency verification tool in the system for verifying high-performance table data consistency between remote DBMS tables according to the third embodiment of the present invention.

Referring to FIG. 7, in the system 3000 for verifying high-performance table data consistency between remote DBMS tables according to the third embodiment of the present invention, the third consistency verification tool 500 includes a third request unit 510, a third storage unit 520, an encoding unit 530, a second extraction unit 540, a third comparison verification unit 550, and a third output unit 560.

The third request unit 510 requests extraction of the table data to each of the source DBMSs 400 having different character sets and the target DBMSs 600 having different character sets.

The third storage unit 520 is returned with and stores data extracted with the Hexcode of the table data from the table of each of the source DBMSs 400 having different character sets and the target DBMSs 600 having different character sets.

The encoding unit 530 encodes the data stored in the third storage unit 520 into character sets suitable for the source DBMSs 400 having different character sets and the target DBMSs 600 having different character sets.

The second extractor 540 extracts a hash value from the encoded data.

The third comparison verification unit 550 compares and verifies the hash values extracted by the second extraction unit 540.

The third output unit 560 outputs verification data of which verification is completed by the third comparison verification unit 550.

The operator confirms the verification data outputted by the third output unit 560 to confirm a data consistency verification result.

In other words, data consistency verification between DBMSs having different character sets is performed as follows.

For example, in order to verify data consistency between DBMSs having different character sets, data is extracted by a Hexcode by using the internal function provided by the DBMS when extracting data, and encoded into the character sets suitable for each DBMS to verify the data consistency with the extracted hash value.

In this way, the consistency verification tool as described in the first to third embodiments further includes the following functions.

For example, data between predetermined intervals may be compared by adding conditions for large-capacity tables in the DBMS.

In addition, data in only Large Object (LOB) columns can be compared separately.

Here, the LOB type data is a data type that may store large unstructured data.

For example, the LOB data type is introduced from Oracle 8i version, and used the LONG type in the previous version.

The LOB type may be divided into four types.

CLOB as a character large object (Character), e.g. Oracle performs an implicit conversion between CLOB and VARCHAR2.

BLOB is a binary large object, such as image, video, MP3, etc.

NCLOB is a national character large object, and is a character following the National Character Set defined in Oracle.

In addition, it is possible to perform the NCLOB by automatically discriminating the character set of the DBMS and automatically discriminating options optimized for the DBMS.

Further, the NCLOB has a mapping function between the source DBMS and the target DBMS.

At this time, even if the schema and table names of the source DBMS and target DBMS tables are different, and only specific columns of "~" can be selectively compared.

Here, schema is a concept that begins to be used to describe the Data Systems Language Conference (CODASYL) database.

In other words, regarding the structure of the database, the logical structure when viewed by the user and the physical structure when viewed by the computer are described.

There is a conceptual schema that defines the structure of the entire data, an external schema that defines the data structure actually handled by users, and an internal schema that specifically defines the format of the data structure.

On the other hand, a verified table report may be provided.

As described above, according to the present invention, there is an effect in that it is possible to minimize operational service downtime by verifying data consistency within a short period of time in a table unit during migration, perform consistency verification even for data from DBMSs having different character sets, without separate processing in an operating DB, and automate a process of manually verifying the consistency of hundreds to thousands of tables.

In the above, although several preferred embodiments of the present invention have been described with some examples, the descriptions of various exemplary embodiments described in the "Specific Content for Carrying Out the Invention" item are merely exemplary, and it will be appreciated by those skilled in the art that the present invention can be variously modified and carried out or equivalent executions to the present invention can be performed from the above description.

In addition, since the present invention can be implemented in various other forms, the present invention is not limited by the above description, and the above description is for the purpose of completing the disclosure of the present invention, and the above description is just provided to completely inform those skilled in the art of the scope of the present invention, and it should be known that the present invention is only defined by each of the claims.

INDUSTRIAL APPLICABILITY

According to the present invention, there is an effect in that it is possible to minimize operational service downtime by verifying data consistency within a short period of time in a table unit during migration, perform consistency verification even for data from DBMSs having different character sets, without separate processing in an operating DB, and automate a process of manually verifying the consistency of hundreds to thousands of tables.

The invention claimed is:

1. A system for verifying high-performance table data consistency between remote DBMS tables, the system comprising:
   a source DBMS;
   a homogeneous target DBMS to the source DBMS; and
   a processor and a memory storing instructions that, when executed by the processor, implement a first consistency verification unit that automates comparing hash values of a table of the source DBMS and a table of the target DBMS, respectively, and verifying data consistency,
   wherein the first consistency verification unit includes a first request unit requesting a query using a hash function to each of the source DBMS and the target DBMS, a first storage unit being returned with and storing hash values extracted by performing the query from the source DBMS and the target DBMS, respectively, a first comparison verification unit comparing and verifying the hash values in unit of a table, and a first output unit outputting verification data of which verification is completed, and
   wherein the system includes a second source DBMS and a second target DBMS having a different character set from the second source DBMS, and a second consistency verification unit comparing hash values of a table of the second source DBMS and a table of the second target DBMS, respectively, and verifying data consistency,
   wherein the comparison is performed in parallel.

2. A system for verifying high-performance table data consistency between remote DBMS tables, the system comprising:
- a source DBMS;
- a heterogeneous target DBMS to the source DBMS; and
- a processor and a memory storing instructions that, when executed by the processor, implement a first consistency verification unit that automates comparing hash values of a table of a source DBMS and a table of the target DBMS, respectively, and verifying data consistency,
- wherein the first consistency verification unit includes a second request unit requesting extraction of table data to a table of each of the source DBMS and the target DBMS, a second storage unit being returned with and storing the table data extracted from the table of each of the source DBMS and the target DBMS, and a second computation unit computing a hash value from each table data;
- wherein the system further includes a second source DBMS and a second target DBMS having a different character set from the second source DBMS, and a second consistency verification unit comparing hash values of a table of the second source DBMS and a table of the second target DBMS, respectively, and verifying data consistency,
- wherein the first consistency verification unit includes:
    - a first extraction unit extracting a computed hash value,
    - a second comparison verification unit comparing and verifying the hash values, and
    - a second output unit outputting verification data of which verification is completed, and
- wherein the comparison is performed in parallel.

3. An automated method for verifying high-performance table data consistency between remote DBMS tables, the automated method comprising:
- extracting table data from each of a source DBMS and a target DBMS having a different character set from the source DBMS;
- storing the data with a Hexcode of the table data from each of the source DBMS and the target DBMS;
- encoding the data with character sets suitable for the source DBMS and the target DBMS;
- extracting a plurality of hash values from the encoded data;
- comparing the plurality of hash values of the table data of the source DBMS and a table of the target DBMS, respectively; and
- verifying data consistency based on a result of comparing of the plurality of hash values of the table data of the source DBMS and a table of the target DBMS, respectively.

* * * * *